United States Patent
Laine et al.

(10) Patent No.: US 11,952,060 B2
(45) Date of Patent: Apr. 9, 2024

(54) STEERING ASSEMBLY FOR A VEHICLE

(71) Applicant: Volvo Truck Corporation, Gothenburg (SE)

(72) Inventors: Leo Laine, Härryda (SE); Jan-Inge Svensson, Gothenburg (SE); Lionel Farres, Heyrieux (FR); Christian Oscarsson, Stenungsund (SE); Leon Henderson, Gothenburg (SE); Jose Vilca, Gothenburg (SE); Kristoffer Tagesson, Hammarö (SE); Johanna Majqvist, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 527 days.

(21) Appl. No.: 17/255,592

(22) PCT Filed: Jun. 25, 2018

(86) PCT No.: PCT/EP2018/066979
§ 371 (c)(1),
(2) Date: Dec. 23, 2020

(87) PCT Pub. No.: WO2020/001736
PCT Pub. Date: Jan. 2, 2020

(65) Prior Publication Data
US 2021/0276614 A1 Sep. 9, 2021

(51) Int. Cl.
*B62D 5/04* (2006.01)
*B62D 3/14* (2006.01)
*B62D 6/00* (2006.01)

(52) U.S. Cl.
CPC ............ *B62D 5/0484* (2013.01); *B62D 3/14* (2013.01); *B62D 5/0463* (2013.01); *B62D 5/0487* (2013.01); *B62D 6/00* (2013.01)

(58) Field of Classification Search
CPC ...... B62D 5/0484; B62D 3/14; B62D 5/0463; B62D 5/0487; B62D 6/00
See application file for complete search history.

(56) References Cited

U.S. PATENT DOCUMENTS

| 6,523,637 B1 | 2/2003 | Nakano et al. |
| 2005/0087390 A1* | 4/2005 | Furumi ................ B62D 5/0421 180/446 |

(Continued)

FOREIGN PATENT DOCUMENTS

| CN | 101184662 A | 5/2008 |
| CN | 107416020 A | 12/2017 |

(Continued)

OTHER PUBLICATIONS

First Office Action for Chinese Patent Application No. 201880094724.3, dated Aug. 16, 2022, 8 pages.

(Continued)

*Primary Examiner* — Jeff A Burke
*Assistant Examiner* — Mohamad O El Sayah
(74) *Attorney, Agent, or Firm* — Withrow & Terranova, PLLC

(57) ABSTRACT

The invention relates to a steering assembly (12) for a vehicle (10). The steering assembly (12) comprises a first steering actuator (14) and a second steering actuator (16). The first steering actuator (14) is adapted to be actuated in accordance with at least one signal issued from a motion control system (18) to control a steering angle of at least one steerable ground engaging member (20, 22) of the vehicle (10) to thereby control the steering of the vehicle (10). The first steering actuator (14) is associated with a first nominal steering capability, defining at least one limitation of at least one of the following: steering angle, steering angle rate and steering torque, for the at least one steerable ground engaging member (20, 22). The second steering actuator (16) is (Continued)

adapted to be actuated in accordance with at least one signal issued from the motion control system (18) to control the steering angle of the at least one steerable ground engaging member (20, 22) of the vehicle (10) to thereby control the steering of the vehicle (10). The second steering actuator (16) is associated with a second nominal steering capability, defining at least one limitation of at least one of the following: steering angle, steering angle rate and steering torque, for the at least one steerable ground engaging member (20, 22). The motion control system (18) is adapted to, upon detection of a malfunction associated with the first steering actuator (14), associate the second steering actuator (16) with a second enhanced steering capability instead of the second nominal steering capability. The second enhanced steering capability is different from the second nominal steering capability.

25 Claims, 7 Drawing Sheets

(56) References Cited

U.S. PATENT DOCUMENTS

| | | | | |
|---|---|---|---|---|
| 2011/0066331 | A1* | 3/2011 | Yamashita | B62D 5/0481 |
| | | | | 701/42 |
| 2012/0271513 | A1* | 10/2012 | Yoneda | B62D 5/0484 |
| | | | | 701/41 |
| 2016/0001781 | A1* | 1/2016 | Fung | G07C 9/37 |
| | | | | 701/36 |
| 2017/0291560 | A1* | 10/2017 | Schroeder | B60T 8/92 |
| 2018/0162390 | A1* | 6/2018 | Miura | B60W 10/20 |
| 2018/0257701 | A1* | 9/2018 | Tsuchimoto | B62D 5/049 |
| 2019/0108694 | A1* | 4/2019 | Huang | G07C 5/0816 |

FOREIGN PATENT DOCUMENTS

| | | |
|---|---|---|
| EP | 0857638 A2 | 8/1998 |
| GB | 2556682 A | 6/2018 |
| JP | H10218000 A | 8/1998 |
| JP | 2004032941 A | 1/2004 |
| JP | 2004129402 A | 4/2004 |
| JP | 2004168257 A | 6/2004 |
| JP | 2015228089 A | 12/2015 |
| WO | 03047949 A1 | 6/2003 |
| WO | 2017060042 A1 | 4/2017 |
| WO | 2017115411 A1 | 7/2017 |
| WO | 2018065409 A1 | 4/2018 |

OTHER PUBLICATIONS

International Preliminary Report on Patentability for PCT/EP2018/066979 dated Jul. 14, 2020, 29 pages.

International Search Report and Written Opinion for PCT/EP2018/066979, dated Apr. 18, 2019, 13 pages.

Notification of Decision for Patent Registration for Korean Patent Application No. 10-2021-7002313, dated Jul. 18, 2023, 8 pages.

* cited by examiner

STEERING ASSEMBLY FOR A VEHICLE

This application is a 35 USC 371 national phase filing of International Application No. PCT/EP2018/066979, filed Jun. 25, 2018, the disclosure of which is incorporated herein by reference in its entirety.

TECHNICAL FIELD

The invention relates to a steering assembly for a vehicle. Moreover, the present invention relates to a vehicle comprising a steering assembly. Further, the present invention relates to a method for steering a vehicle. Additionally, the present invention relates to each one of a computer program, a computer readable medium and a control unit.

The invention can be applied in heavy-duty vehicles, such as trucks, buses and construction equipment. Although the invention will be described with respect to a truck, the invention is not restricted to this particular vehicle, but may also be used in other vehicles such as a bus, a working machine or a car.

BACKGROUND

A contemporary vehicle is generally equipped with a steering assembly for steering the vehicle. Moreover, since the steering of the vehicle is important from for instance a safety point of view, various attempts have been made to ensure a high reliability of the steering function.

For example, WO 03/047949 A1 illustrates a dual-circuit steer-by-wire steering system with two hydraulically operated actuators. However, it is desired to further increase the flexibility and the reliability of a steering assembly.

SUMMARY

An object of the invention is to provide a steering assembly for a vehicle by which steering assembly a reliable steering may be obtained at a reasonable cost.

The object is achieved by a steering assembly according to claim 1.

As such, the present invention relates to a steering assembly for a vehicle, the steering assembly comprises a first steering actuator and a second steering actuator.

The first steering actuator is adapted to be actuated in accordance with at least one signal issued from a motion control system to control a steering angle of at least one steerable ground engaging member of the vehicle to thereby control the steering of the vehicle. The first steering actuator is associated with a first nominal steering capability, defining at least one limitation of at least one of the following: steering angle, steering angle rate and steering torque, for the at least one steerable ground engaging member.

The second steering actuator is adapted to be actuated in accordance with at least one signal issued from the motion control system to control the steering angle of the at least one steerable ground engaging member of the vehicle to thereby control the steering of the vehicle. The second steering actuator is associated with a second nominal steering capability, defining at least one limitation of at least one of the following: steering angle, steering angle rate and steering torque, for the at least one steerable ground engaging member.

According to the present invention, the motion control system is adapted to, upon detection of a malfunction associated with the first steering actuator, associate the second steering actuator with a second enhanced steering capability instead of the second nominal steering capability, the second enhanced steering capability being different from the second nominal steering capability.

As used, herein, the expression "a malfunction associated with the first steering actuator" is not limited to a malfunctioning of the first steering actuator as such. Instead, the above term should be construed such that a malfunctioning has occurred which prevents the first steering actuator from operating properly, e.g. prevents the first steering actuator from controlling a steering angle of at least one steerable ground engaging member. As such, the term "a malfunction associated with the first steering actuator" also encompasses a malfunctioning of one or more components operably connected between the first steering actuator and the at least one steerable ground engaging member.

By virtue of the above steering assembly, each one of the first and second steering actuators may for instance be such that they can perform long-term operations within their corresponding nominal steering capabilities. However, if need be, the second steering actuator can be associated with, and consequently operated within the limits of, a second enhanced steering capability instead. For instance, the second enhanced steering capability may be determined on the basis of maximum short-term capabilities of the second steering actuator.

In view of the above, the cost of the steering assembly may be kept relatively low, since the first and second actuators need to only to be such that they can endure a long-term use within their nominal steering capabilities, but the reliability of the steering functionality of the steering assembly may nevertheless be appropriately high, since the switch to the second enhanced steering capability implies that an appropriate steering may be achieved, though possibly for a limited time period, even when the first steering actuator is not functioning as expected.

Optionally, the second nominal steering capability comprises a second nominal maximum steering angle and the second enhanced steering capability comprises a second enhanced maximum steering angle. The second enhanced maximum steering angle is greater than the second nominal maximum steering angle. Preferably, a ratio between the second enhanced maximum steering angle and the second nominal maximum steering angle is at least two, more preferred at least four. Thus, when a malfunction associated with the first steering actuator is detected, the second steering actuator may be adapted to, at least during a limited time span, control the steering angle of the at least one steerable ground engaging member of the vehicle such that steering angles are obtainable which are greater than the angles obtainable when the second steering actuator is associated with the second nominal steering capability.

Optionally, the first nominal steering capability is different from the second nominal steering capability. As such, the first and second steering actuators may be adapted to carry out different steering manoeuvres.

Optionally, the first nominal steering capability comprises a first nominal maximum steering angle. The first nominal maximum steering angle is greater than the second nominal maximum steering angle. As such, nominally, the first steering actuator may be adapted to achieve greater steering angles than the second steering actuator. Consequently, though only by way of example, the first steering actuator may be adapted to be used during steering operations requiring relatively large steering angles, such as steering during yard work, whereas the second steering actuator may be adapted to be used during steering operations requiring smaller steering angles, such as highway steering.

Optionally, the second nominal steering capability comprises a second nominal maximum actuation load that the second steering actuator is allowed to produce when associated with the second nominal steering capability and the second enhanced steering capability comprises a second enhanced maximum actuation load that the second steering actuator is allowed to produce when associated with the second enhanced steering capability. A ratio between the second enhanced maximum actuation load and the second nominal maximum actuation load is at least 1.5, more preferred at least 2. Varying the maximum allowed actuation load may be a straightforward way to vary the limit for at least one of the following: steering angle, steering angle rate and steering torque. For instance, varying the maximum allowed actuation load may be a straightforward way to vary the limit for the steering angle.

Optionally, the steering assembly comprises a hydraulic steering gear adapted to be connected to the at least one steerable ground engaging member, each one of the first and second steering actuators being adapted to control the operating condition of the hydraulic steering gear. This implies a compact steering assembly that nevertheless is associated with an appropriate level of redundancy.

Optionally, the steering assembly comprises a first hydraulic steering gear adapted to be connected to the at least one steerable ground engaging member. The first steering actuator is adapted to control the operating condition of the first hydraulic steering gear. The steering assembly further comprises a second hydraulic steering gear adapted to be connected to the at least one steerable ground engaging member. The second steering actuator is adapted to control the operating condition of the second hydraulic steering gear. By virtue of the fact that the steering assembly comprises two hydraulic steering gears, an increased level of redundancy may be obtained since the second hydraulic steering gear may be used in the event that the first hydraulic steering gear does not function as expected.

Optionally, the first steering actuator is adapted to produce a first nominal maximum actuation load when associated with the first nominal steering capability and the second steering actuator is adapted to produce a second nominal maximum actuation load when associated with the second nominal steering capability. The first nominal maximum actuation load is greater than the second nominal maximum actuation load, preferably a ratio between the first nominal maximum actuation load and the second nominal maximum actuation load being at least two, more preferred at least four.

Optionally, the motion control system comprises a first vehicle motion management controller and a second vehicle motion management controller, each one of the first and second vehicle motion management controller being adapted to issue the at least one signal for controlling the steering of the vehicle. The first and second vehicle motion management controllers imply a redundant assembly of the control of the first and second steering actuators.

Optionally, each one of the first and second vehicle motion management controllers is adapted to issue said at least one control signal to each one of the first and second steering actuators.

Optionally, the first vehicle motion management controller is adapted to issue said at least one control signal to the first steering actuator, but not to the second steering actuator, and the second vehicle motion management controller is adapted to issue said at least one control signal to the second steering actuator, but not to the first steering actuator.

Optionally, the motion control system is adapted to determine a blind stop path being a path that the vehicle is intended to follow during a malfunction of the vehicle, the motion control system further being adapted to determine whether or not the vehicle can follow the blind stop path if the vehicle is steered using the second steering actuator when associated with the second enhanced steering capability. The determination whether or not the vehicle can follow the blind stop path implies an increased safety of the vehicle. For instance, if it is determined that the vehicle cannot follow the blind stop path under the above-mentioned conditions, an updated blind stop path may be determined, thereby ensuring that the vehicle can follow the blind stop path even in the event of a malfunctioning associated with the first steering actuator. As such, though purely by way of example, the updated blind stop may be determined taking the limitation(s) of the second enhanced steering capability into account, thereby ensuring that the vehicle can follow the updated blind stop path even in the event of a malfunction associated with the first steering actuator.

Optionally, the motion control system is adapted to, upon detection of a malfunction associated with the first steering actuator, associate the second steering actuator with the second enhanced steering capability instead of the second nominal steering capability during a predetermined enhanced steering time only. The enhanced steering time is within the range of 2 to 600 seconds, preferably within the range of 5 to 30 seconds. The above implies that the second steering actuator is associated with second enhanced steering capability for a limited amount of time thereby ensuring that the second steering actuator will not be subjected to large loads during a long time range.

Optionally, the motion control system is adapted to, when no malfunction associated with the first steering actuator is detected, select which one of the first steering actuator, associated with the first nominal steering capability, and the second steering actuator, associated with the second nominal steering capability, should be currently actuated in order to control the steering angle of the at least one steerable ground engaging member and to issue at least one signal to the thus selected steering actuator. Preferably, the motion control system is adapted to make the selection on the basis of at least one of the following: a desired steering angle, a desired steering angle rate and a desired steering torque.

Optionally, the motion control system is adapted to, upon detection of a malfunction associated with the first steering actuator, issue at least one signal to the second steering actuator to control the steering angle of the at least one steerable ground engaging member of the vehicle to thereby control the steering of the vehicle and preferably adapted to, upon detection of a malfunction associated with the first steering actuator, not issue at least one signal for controlling the steering of the vehicle to the first steering actuator.

A second aspect of the present invention relates to a vehicle comprising the steering assembly according to the first aspect of the present invention.

A third aspect of the present invention relates to a method for steering a vehicle comprising a steering assembly that in turn comprises a first steering actuator and a second steering actuator, wherein the first steering actuator is adapted to be actuated in accordance with at least one signal issued from an motion control system to control a steering angle of at least one steerable ground engaging member of the vehicle to thereby control the steering of the vehicle, the first steering actuator being associated with a first nominal steering capability, defining at least one limitation of at least one of the following: steering angle, steering angle rate and steering torque, of the at least one steerable ground engaging member, the second steering actuator is adapted to be actuated in accordance with at least one signal issued from the motion control system to control the steering angle of the at least one steerable ground engaging member of the vehicle to thereby control the steering of the vehicle, the second steering actuator being associated with a second nominal steering capability, defining at least one limitation of at least one of the following: steering angle, steering angle rate and steering torque, of the at least one steerable ground engaging member.

According to the third aspect of the present invention, the method further comprises: upon detection of a malfunction associated with the first steering actuator, associating the second steering actuator with a second enhanced steering capability instead of the second nominal steering capability, the second enhanced steering capability being different from the second nominal steering capability, and steering the vehicle using the second steering actuator.

Optionally, the second nominal steering capability comprises a second nominal maximum steering angle and the second enhanced steering capability comprises a second enhanced maximum steering angle. The second enhanced maximum steering angle is greater than the second nominal maximum steering angle. Preferably, a ratio between the second enhanced maximum steering angle and the second nominal maximum steering angle is at least two, more preferred at least four.

Optionally, the first nominal steering capability is different from the second nominal steering capability.

Optionally, the first nominal steering capability comprises a first nominal maximum steering angle, the first nominal maximum steering angle being greater than the second nominal maximum steering angle.

Optionally, the second nominal steering capability comprises a second nominal maximum actuation load that the second steering actuator is allowed to produce when associated with the second nominal steering capability and wherein the second enhanced steering capability comprises a second enhanced maximum actuation load that the second steering actuator is allowed to produce when associated with the second enhanced steering capability. A ratio between the second enhanced maximum actuation load and the second nominal maximum actuation load is at least 1.5, more preferred at least 2.

Optionally, the second enhanced steering capability comprises a second enhanced maximum steering angle, the second enhanced maximum steering angle being greater than the second nominal maximum steering angle.

Optionally, the steering assembly comprises a hydraulic steering gear adapted to be connected to the at least one steerable ground engaging member, each one of the first and second steering actuators being adapted to control the operating condition of the hydraulic steering gear.

Optionally, the steering assembly comprises a first hydraulic steering gear adapted to be connected to the at least one steerable ground engaging member. The first steering actuator is adapted to control the operating condition of the first hydraulic steering gear. The steering assembly further comprises a second hydraulic steering gear adapted to be connected to the at least one steerable ground engaging member. The second steering actuator is adapted to control the operating condition of the second hydraulic steering gear.

Optionally, the first steering actuator is adapted to produce a first nominal maximum actuation load when associated with the first nominal steering capability and the second steering actuator is adapted to produce a second nominal maximum actuation load when associated with the second nominal steering capability. The first nominal maximum actuation load is greater than the second nominal maximum actuation load. Preferably, a ratio between the first nominal maximum actuation load and the second nominal maximum actuation load is at least two, more preferred at least four.

Optionally, the method further comprises determining a blind stop path being a path that the vehicle is intended to follow during a malfunction of the vehicle. The method further comprises determining whether or not the vehicle can follow the blind stop path if the vehicle is steered using the second steering actuator when associated with the second enhanced steering capability.

Optionally, the method comprises, upon detection of a malfunction associated with the first steering actuator, associate the second steering actuator with the second enhanced steering capability instead of the second nominal steering capability during a predetermined enhanced steering time only. The enhanced steering time is within the range of 2 to 600 seconds, preferably within the range of 5 to 30 seconds.

Optionally, the method comprises, when no malfunction associated with the first steering actuator is detected, selecting which one of the first steering actuator, associated with the first nominal steering capability, and the second steering actuator, associated with the second nominal steering capability, should be currently actuated in order to control the steering angle of the at least one steerable ground engaging member and to issue at least one signal to the thus selected steering actuator. Preferably, the selection is made on the basis of at least one of the following: a desired steering angle, a desired steering angle rate and a desired steering torque.

A fourth aspect of the present invention relates to a computer program comprising program code means for performing the steps of the third aspect of the present invention when the program is run on a computer.

A fifth aspect of the present invention relates to a computer readable medium carrying a computer program comprising program code means for performing the steps of the third aspect of the present invention when the program product is run on a computer.

A sixth aspect of the present invention relates to a control unit for controlling the steering of a vehicle, the control unit being configured to perform the steps of the method according to the third aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a steering assembly according to the present invention.

However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
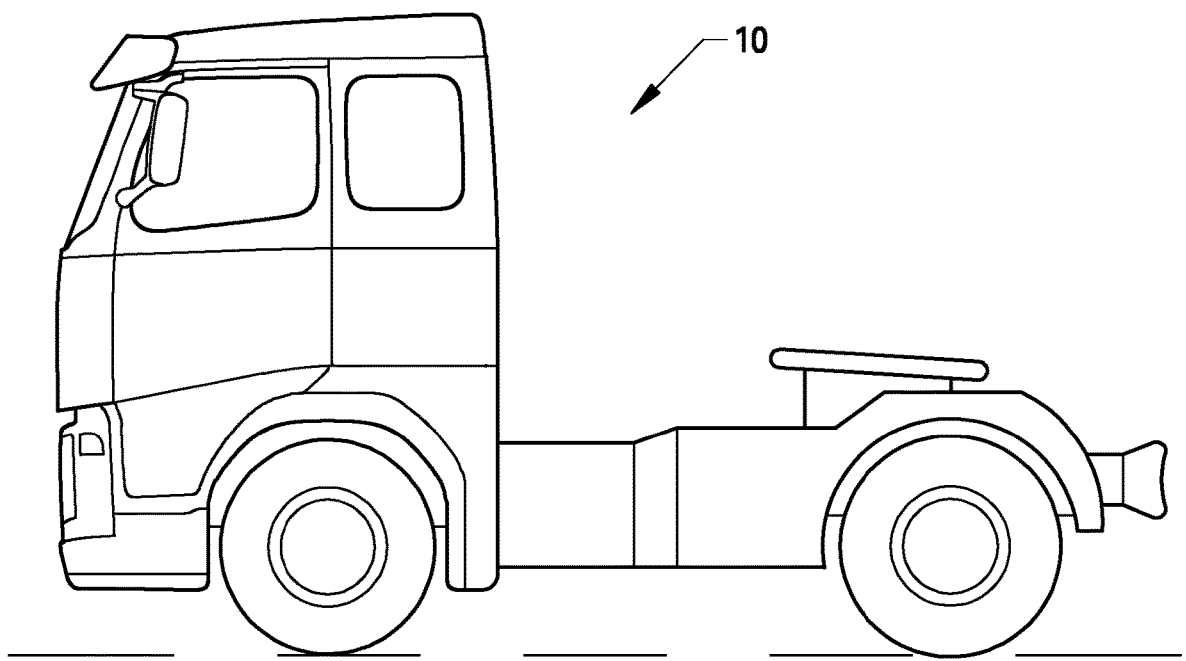
FIG. 1 is a schematic view of a vehicle.
Figure 2:
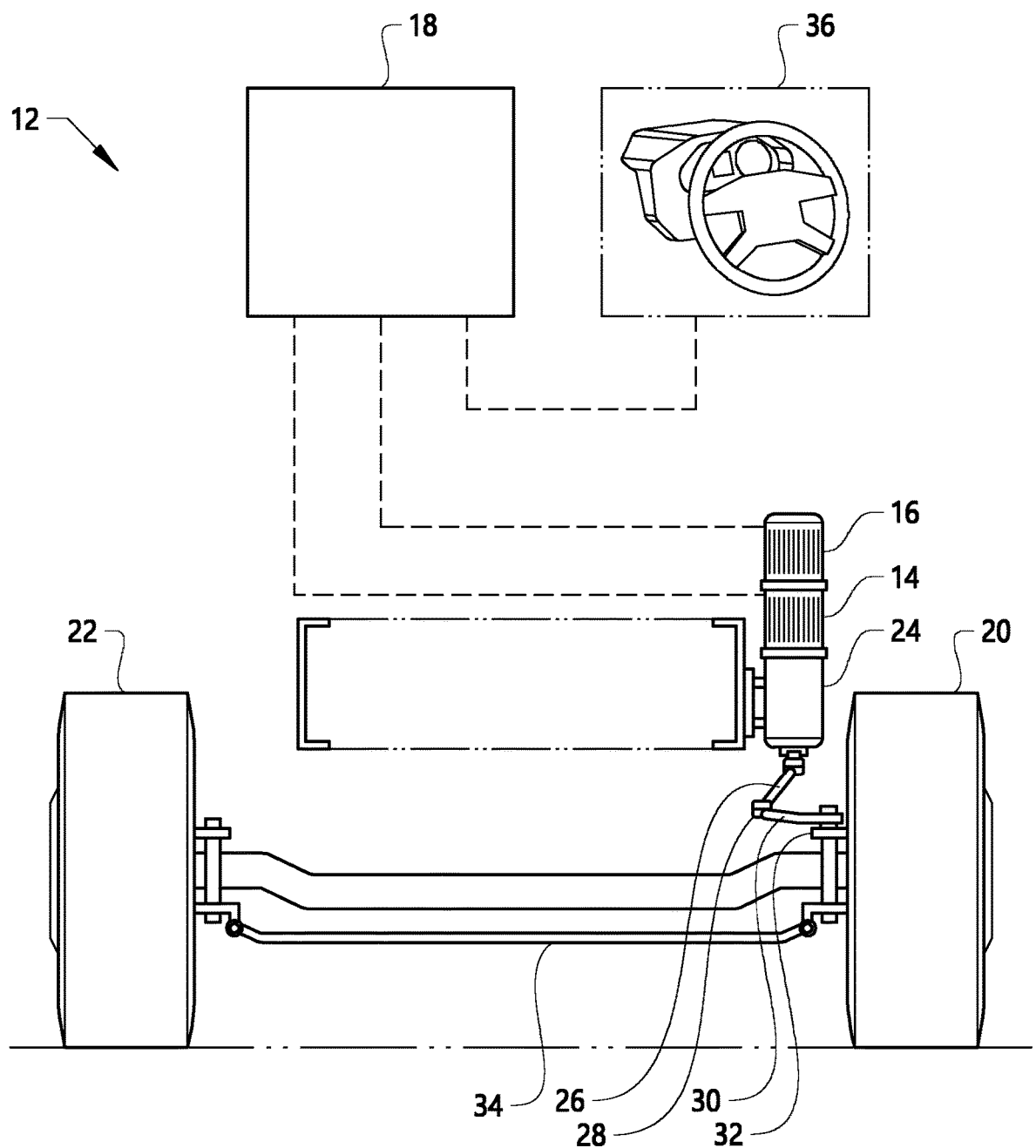
FIG. 2 is a schematic view of a steering assembly according to an embodiment of the present invention.

The FIG. 1 vehicle 10 comprises a steering assembly 12 as illustrated in FIG. 2. As may be gleaned from FIG. 2, the steering assembly comprises a first steering actuator 14 and a second steering actuator 16. Purely by way of example, each one of the first and second steering actuators 14, 16 may be electrical actuators, e.g. electrical motors adapted to produce a torque.

Furthermore, FIG. 2 illustrates that the first steering actuator 14 is adapted to be actuated in accordance with at least one signal issued from a motion control system 18 to control a steering angle of at least one steerable ground engaging member 20, 22 of the vehicle to thereby control the steering of the vehicle. In the FIG. 2 embodiment, the steerable ground engaging members 20, 22 are illustrated as wheels although other implementations of steerable ground engaging member, such as crawlers (not shown), are also envisaged.

The first steering actuator 14 is associated with a first nominal steering capability, defining at least one limitation of at least one of the following: steering angle, steering angle rate and steering torque, for the at least one steerable ground engaging member 20, 22.

In a similar vein, the second steering actuator 16 is adapted to be actuated in accordance with at least one signal issued from the motion control system 18 to control the steering angle of the at least one steerable ground engaging member 20, 22 of the vehicle to thereby control the steering of the vehicle.

The second steering actuator 16 is associated with a second nominal steering capability, defining at least one limitation of at least one of the following: steering angle, steering angle rate and steering torque, for the at least one steerable ground engaging member.

As such, the vehicle can be steered using either one, or possibly both, of the first steering actuator 14 and the second steering actuator 16. Preferably, each one of the first and second steering actuator 14, 16 is such that it produces only a small resistance, e.g. in terms of friction, when not used for steering.

The steering assembly 12 comprising a first steering actuator 14 and a second steering actuator 16 may be implemented in a plurality of different ways. For instance, and as exemplified in FIG. 2, the steering assembly 12 may comprise a hydraulic steering gear 24 adapted to be connected to the at least one steerable ground engaging member 20, 22. Moreover, in the FIG. 2 embodiment, each one of the first and second steering actuators 14, 16 is adapted to control the operating condition of the hydraulic steering gear 24.

To this end, the steering assembly 12 comprises a fluid supply assembly (not shown) for supplying pressurized fluid to the hydraulic steering gear 24. Purely by way of example, the fluid supply assembly may comprise a servo pump (not shown) and a fluid reservoir (not shown). As a non-limiting example, the fluid may be a liquid, e.g. hydraulic liquid.

Moreover, the hydraulic steering gear 24 may be mechanically connected to at least one of the ground engaging members 20, 22—in the FIG. 2 embodiment, the hydraulic steering gear 24 is mechanically connected to the ground engaging member 20 located on the left hand side of the vehicle when the vehicle is viewed from behind—via a transmission arrangement that for instance may comprise a drop arm 26 which in turn is connected to a drag link 28. The drag link 28 is connected to a steering arm 30 which is connected to a steering knuckle 32 associated with the left hand side ground engaging member 20. Thus, the hydraulic steering gear 24 is mechanically connected to the left hand side ground engaging member 20 via the following components (in order): the drop arm 26, the drag link 28, the steering arm 30 and the steering knuckle 32.

Moreover, the right hand side ground engaging member 22 is connected to the left hand side ground engaging member 20 via a connecting arm 34 such that a change of steering angle of the left hand side ground engaging member 20 results in a corresponding change of steering angle of the right hand side ground engaging member 22.

Furthermore, the steering assembly 12 comprises a steering input device 36. In FIG. 2, the steering input device 36 is exemplified as a steering wheel although other implementations of the steering input device 36 are also envisaged. Purely by way of example, the steering input device 36 may be implemented as a joystick (not shown) or a touch screen (not shown). Irrespective of the implementation of the input device 36, the input device 36 is adapted to issue at least one signal to the motion control system 18 which at least one signal are indicative of a desired steering of the vehicle.

It should be noted that the steering input device 36 need not be a manual steering input device. For instance the vehicle may be an autonomous vehicle resulting in that the steering input device 36 is a device automatically determining a desired steering. For instance, the steering input device 36 may form part of the motion control system 18. Moreover, it is contemplated that the steering input device 36 may constitute, or form part of, a system that automatically determines a desired steering of the vehicle. To this end, as a non-limiting example, the steering input device 36 may form part of a "Traffic Situation Management" as described hereinbelow with reference to each one of FIGS. 4 and 5.

As another option, the steering input device 36 may be mechanically connected to each one of the first and second steering actuators 14, 16, for instance via a steering column (not shown).

Figure 3:
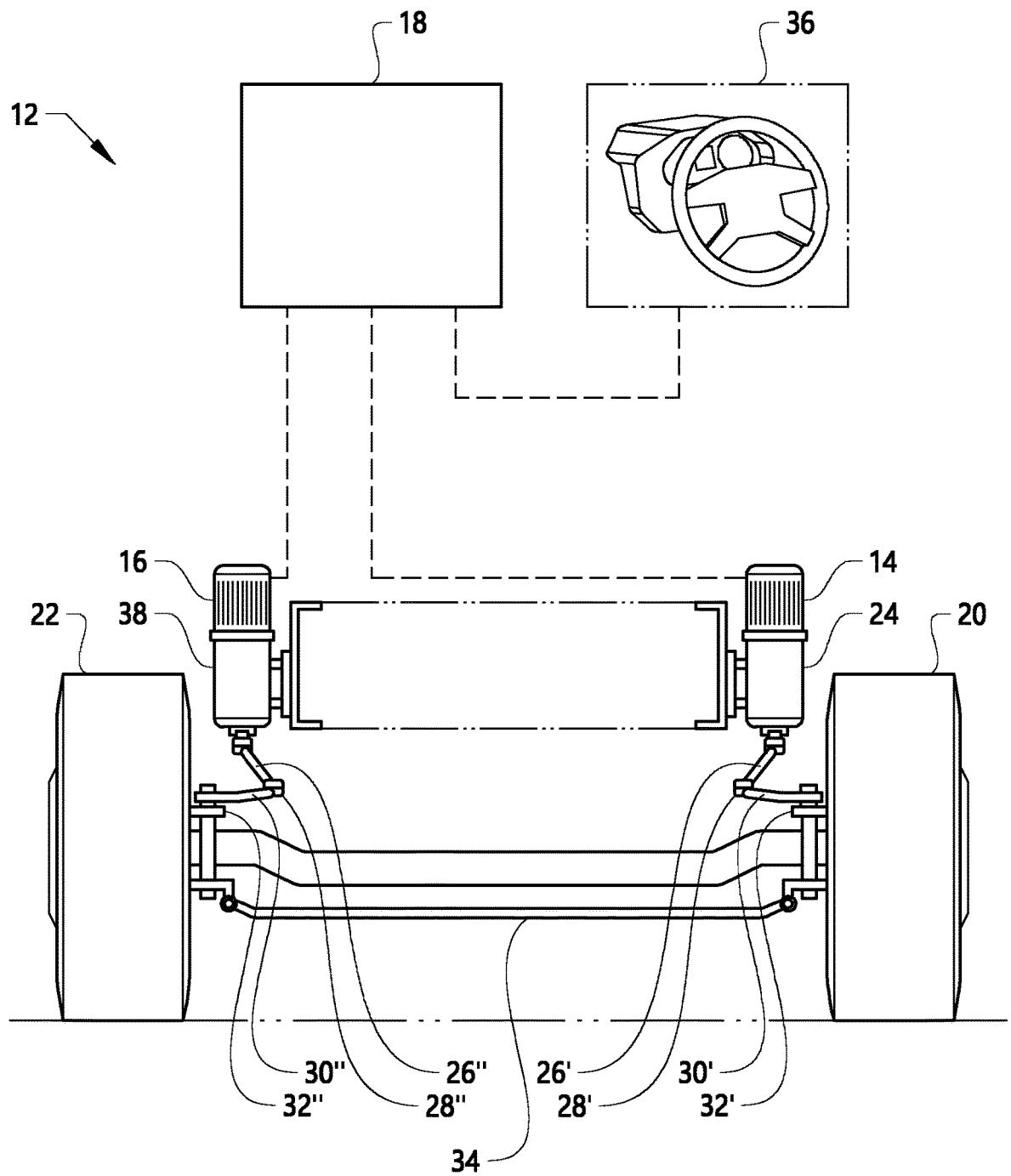
FIG. 3 is a schematic view of a steering assembly according to another embodiment of the present invention.

FIG. 3 illustrates another embodiment of the steering assembly 12. In a similar vein as in the FIG. 2 embodiment, the steering assembly 12 embodiment illustrated in FIG. 3, comprises a first hydraulic steering gear 24 adapted to be connected to the at least one steerable ground engaging member 20. The first steering actuator 14 is adapted to control the operating condition of the first hydraulic steering gear 24.

However, unlike the FIG. 2 embodiment, the steering assembly 12 embodiment illustrated in FIG. 3 further comprises a second hydraulic steering gear 38 adapted to be connected to the at least one steerable ground engaging member 20, 22. The second steering actuator 16 is adapted to control the operating condition of the second hydraulic steering gear 38.

Thus, and as may be gleaned from FIG. 3, the first hydraulic steering gear 24 may be mechanically connected one of the ground engaging member 20, 22—in the FIG. 2 embodiment, the first hydraulic steering gear 24 is mechanically connected to the ground engaging member 20 located on the left hand side of the vehicle when the vehicle is viewed from behind via the following components (in order): a first drop arm 26', a first drag link 28', a first steering arm 30' and a first steering knuckle 32'.

Further, as illustrated in FIG. 3, the second hydraulic steering gear 38 may be mechanically connected one of the ground engaging member 20, 22—in the FIG. 2 embodiment, the second hydraulic steering gear 38 is mechanically connected to the ground engaging member 22 located on the right hand side of the vehicle when the vehicle is viewed from behind via the following components (in order): a second drop arm 26", a second drag link 28", a second steering arm 30" and a second steering knuckle 32".

Moreover, although not illustrated in FIG. 3, the steering assembly 12 may comprise a first fluid supply assembly (not shown) for supplying pressurized fluid to the first hydraulic steering gear 24 and a second fluid supply assembly (not shown) for supplying pressurized fluid to the second hydraulic steering gear 38. Purely by way of example, each one of the first and second fluid supply assemblies may comprise a servo pump (not shown) and a fluid reservoir (not shown). As a non-limiting example, the fluid may be a liquid, e.g. a hydraulic liquid such as hydraulic oil.

Moreover, though purely by way of example, the first and second fluid supply assemblies may be separated from each other in order to enhance the redundancy of the steering assembly 12. As a non-limiting example, the servo pump of the first fluid supply assembly may be driven by an internal combustion engine (not shown) of the vehicle whereas the servo pump of the second fluid supply assembly may be driven by an electric motor (not shown).

Irrespective of the embodiment of the steering assembly 12—for instance irrespective of whether the first and second steering actuators 14, 16 are connected to the same hydraulic steering gear or to different hydraulic steering gears—according to the present invention, the motion control system 18 is adapted to, upon detection of a malfunction associated with the first steering actuator 14, associate the second steering actuator 16 with a second enhanced steering capability instead of the second nominal steering capability. The second enhanced steering capability is different from the second nominal steering capability.

The above association may be obtained in a plurality of ways. Purely by way of example, the motion control system 18 may comprise a memory in which information, e.g. in terms of limits, indicative of the second nominal steering capability and the second enhanced steering capability, respectively, are stored. Moreover, the motion control system 18 may itself ensure that the at least one signal issued therefrom does not result in that the second steering actuator 16 is controlled in a manner that would result in a breach of the capability currently associated with the second steering actuator 16. Purely by way of example, if the second steering actuator 16 is currently associated with the second nominal steering capability and assuming that the second nominal steering capability comprises a limitation of the steering angle rate for the at least one steerable ground engaging member 20, 22, the motion control system 18 may comprise a functionality, e.g. in terms of a routine or the like, which verifies that a signal intended to be sent to the second steering actuator 16 does not result in that the steering angle rate limitation is violated.

As another option, the steering capabilities for a steering actuator may be stored in a memory of the steering actuator. As such, though only by way of example, the second steering actuator 16 may comprise a memory with information indicative of the second nominal steering capability and the second enhanced steering capability. Then, when the second steering actuator 16 receives a signal with a steering request from the motion control system 18, the second steering actuator 16 itself can determine, e.g. using a routine accommodated with the second steering actuator 16, whether or not the steering request is acceptable in view of the currently associated capacity or if the second steering actuator 16 in any way need to modify the steering request before executing it.

In embodiments in which the steering capabilities are stored in a memory of the steering actuator, the motion control system 18 may be adapted to issue a signal to the steering actuator indicative of which capability that should currently be associated with the steering actuator. For instance, assuming that a steering actuator has two different capabilities, the motion control system 18 may be adapted to issue a control signal with a flag, e.g. on/off or 0/1, to the steering actuator such that the desired capacity is used by the steering actuator.

The first nominal steering capability may be different from the second nominal steering capability. Purely by way of example, the first nominal steering capability may comprise a first nominal maximum steering angle $\alpha_{1,nom}$ and the second nominal steering capability may comprise a second nominal maximum steering angle $\alpha_{2,nom}$. The first nominal maximum steering angle $\alpha_{1,nom}$ may be greater than the second nominal maximum steering angle $\alpha_{2,nom}$. Purely by way of example, a ratio $\alpha_{1,nom}/\alpha_{2,nom}$ between the first nominal maximum steering angle $\alpha_{1,nom}$ and the second nominal maximum steering angle $\alpha_{2,nom}$ may be at least 2, preferably at least 3. The above examples of the ratio $\alpha_{1,nom}/\alpha_{2,nom}$ can be used for any embodiment of the present invention.

As used herein, first nominal maximum steering angle $\alpha_{1,nom}$ relates to the maximum steering angle, as measured from a neutral steering position in which the vehicle moves straight ahead, to which the first steering actuator 14 is allowed to move the at least one steerable ground engaging members 20, 22 when the first steering actuator 14 is associated with the nominal steering capability. In a similar vein, the second nominal/enhanced maximum steering angle $\alpha_{2,nom}/\alpha_{2,en}$ relates to the maximum steering angle, as measured from a neutral steering position in which the vehicle moves straight ahead, to which the second steering actuator 16 is allowed to move the at least one steerable ground engaging members 20, 22 when the second steering actuator 16 is associated with the second nominal/enhanced maximum steering angle $\alpha_{2,nom}/\alpha_{2,en}$.

As a non-limiting example, the first nominal maximum steering angle $\alpha_{1,nom}$ may be such that the first steering actuator 14 may be used for operations—such as yard work—requiring relatively large steering angles. Purely by way of example, the first nominal maximum steering angle $\alpha_{1,nom}$ may be within the range of 40-60°.

As such, though purely by way of example, the motion control system 18 may be adapted to, when no malfunction associated with the first steering actuator 14 is detected, select which one of the first steering actuator 14, associated with the first nominal steering capability, and the second steering actuator 16, associated with the second nominal steering capability, should be currently actuated in order to control the steering angle of the at least one steerable ground engaging member 20, 22 and to issue at least one signal to the thus selected steering actuator 14, 16. Preferably, the motion control system 18 is adapted to make the selection on the basis of at least one of the following: a desired steering angle, a desired steering angle rate and a desired steering torque.

Moreover, again as a non-limiting example, the second nominal maximum steering angle $\alpha_{2,nom}$ may be such that the second steering actuator 16 may be used for operations—such as highway steering—requiring relatively small steering angles. Purely by way of example, the second nominal maximum steering angle $\alpha_{2,nom}$ may be within the range of 5-150.

Furthermore, though again purely by way of example, the second enhanced steering capability may comprise a second enhanced maximum steering angle $\alpha_{2,en}$ wherein the second enhanced maximum steering angle $\alpha_{2,en}$ is greater than the second nominal maximum steering angle $\alpha_{2,nom}$. As a non-limiting example, a ratio $\alpha_{2,en}/\alpha_{2,nom}$ between the second enhanced maximum steering angle $\alpha_{2,en}$ and the second nominal maximum steering angle $\alpha_{2,nom}$ may be at least two, more preferred at least four.

As such, when the second steering actuator 16 is associated with the second enhanced steering capability $\alpha_{2,en}$ instead of the second nominal steering capability $\alpha_{2,nom}$, the second steering actuator 16 is allowed to impart greater steering angles to at least one steerable ground engaging members 20, 22 of a vehicle as compared to a situation in which the second steering actuator 16 is associated with the second nominal maximum steering angle $\alpha_{2,nom}$.

Instead of, or for instance as a part of using the maximum steering angles discussed above, the second nominal steering capability may comprise a second nominal maximum actuation load that the second steering actuator is allowed to produce when associated with said second nominal steering capability and the second enhanced steering capability comprises a second enhanced maximum actuation load $M_{2,en,max}$ that the second steering actuator 16 is allowed to produce when associated with the second enhanced steering capability. In embodiments, see for instance the examples discussed above and below, where the second steering actuator 16 is adapted to control the operating condition of a hydraulic steering gear 24, 38, the maximum actuation load (i.e. one of the second nominal maximum actuation load and the second enhanced maximum actuation load) corresponds to the maximum load that the second steering actuator can impart the subject hydraulic steering gear 24, 38. Moreover, a ratio $M_{2,en,max}/M_{2,nom,max}$ between said second enhanced maximum actuation load $M_{2,en,max}$ and said second nominal maximum actuation load $M_{2,nom,max}$ may be at least 1.5, more preferred at least 2.

As a non-limiting example, when the second steering actuator 16 is adapted to produce a torque, e.g. impart a torque on a hydraulic steering gear 24, 38, the second nominal maximum actuation load $M_{2,nom,max}$ may be within the range of 3-8 Nm, preferably within the range of 4-6 Nm, and the second enhanced maximum actuation load $M_{2,en,max}$ may be within the range of 8-12 Nm.

Moreover, the first steering actuator 14 may be adapted to produce a first nominal maximum actuation load $M_{1,nom,max}$ when associated with the first nominal steering capability and the second steering actuator 16 may be adapted to produce a second nominal maximum actuation load $M_{2,nom,max}$ when associated with the second nominal steering capability. The first nominal maximum actuation load $M_{1,nom,max}$ may be greater than the second nominal maximum actuation load $M_{2,nom,max}$. Purely by way of example, a ratio $M_{1,nom,max}/M_{2,nom,max}$ between the first nominal maximum actuation load $M_{1,nom,max}$ and the second nominal maximum actuation load $M_{2,nom,max}$ may be at least two, more preferred at least four.

Irrespective of how the second nominal and enhanced steering capabilities are defined and/or used, the motion control system 18 may be adapted to, upon detection of a malfunction associated with the first steering actuator 14, associate the second steering actuator 16 with the second enhanced steering capability instead of the second nominal steering capability during a predetermined enhanced steering time only. The enhanced steering time may be within the range of 2 to 600 seconds, preferably within the range of 5 to 30 seconds.

Figure 4:
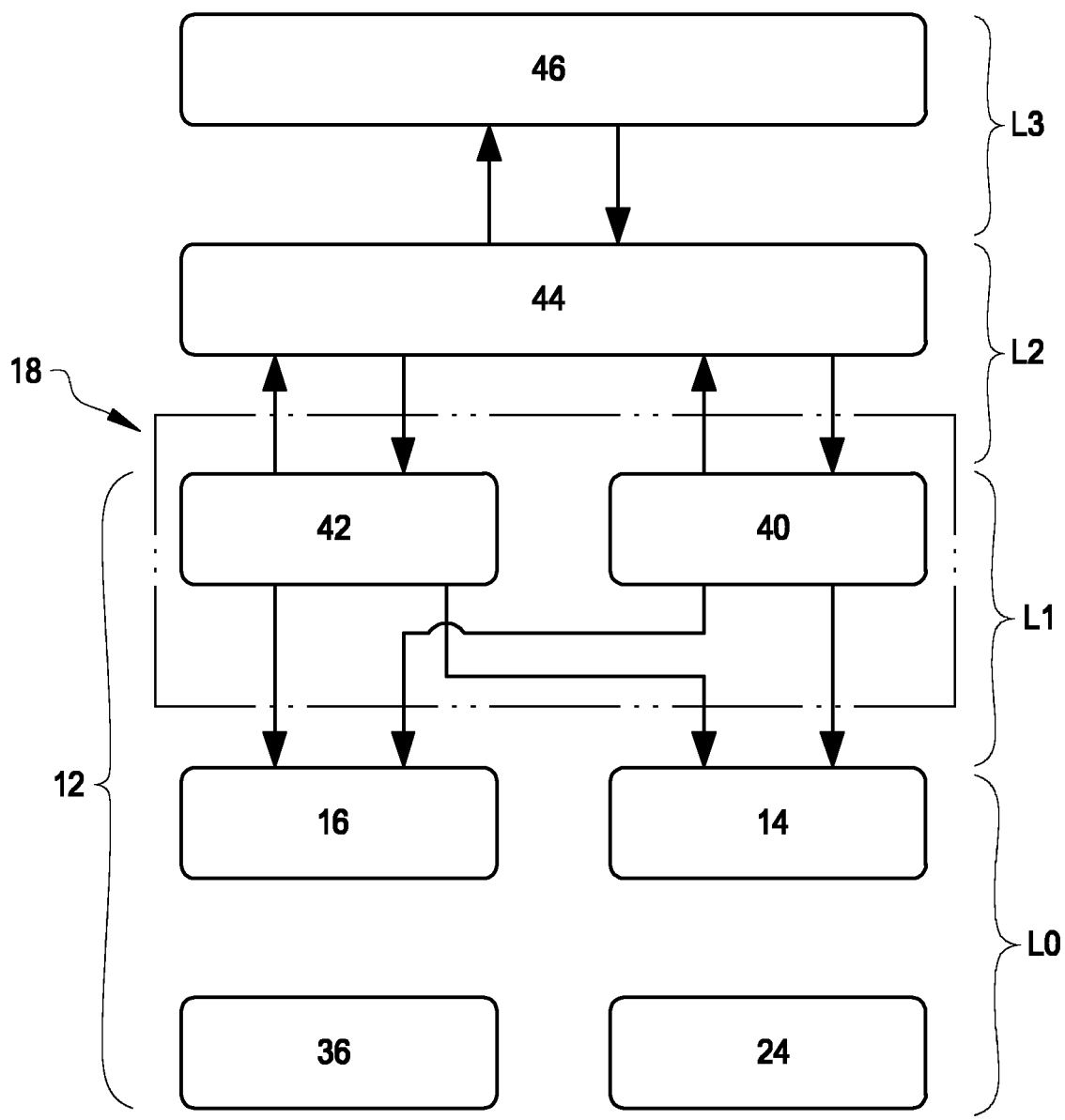
FIG. 4 is a schematic view of a steering assembly according to a further embodiment of the present invention.

FIG. 4 illustrates an embodiment of the steering assembly 12 in which the motion control system 18 comprises a first vehicle motion management controller 40 and a second vehicle motion management controller 42. Each one of the first and second vehicle motion management controllers 40, 42 is adapted to issue the at least one signal for controlling the steering of the vehicle.

As may be gleaned from FIG. 4, the steering assembly 12 may form part of an autonomous drive system of a vehicle, which autonomous drive system comprises a plurality of layers L0-L3. A base layer L0 comprises trajectory control entities such as the steering actuators 14, 16 and the one or more hydraulic steering gears 24, 38. The motion control system 18 forms part of a vehicle motion and power management layer L1. Consequently, in the FIG. 4 example, each one of the first and second vehicle motion management controllers 40, 42 forms part of a vehicle motion and power management layer L1.

Moreover, as may be gleaned from FIG. 4, the autonomous drive system of a vehicle comprises two additional layers L2 and L3.

Layer L2, indicated by box 44 in FIG. 4, may be referred to as "Traffic Situation Management" and comprises one or more electronic control units or equivalent computing resources to make decisions about vehicle short term trajectory, for example up to 5 to 10 seconds ahead. At layer L2, there may be provided precise geolocation means such GPS, Glonass™, Galileo™ and likewise solutions, and/or relative location means with regard to road lane (beacons or the like). At layer L2, there may be provided cameras for delivering a flow of images about the vehicle immediate environment. Decisions about vehicle short term trajectory are transmitted to the lower layer L1 as requests. Lower layer L1 returns to layer L2 the actual behaviour of the vehicle, and high level status of the vehicle motion systems.

Layer L3, indicated by box 46 in FIG. 4, may be referred to as "Route Management" and comprises one or more electronic control units or equivalent computing resources to make decisions about vehicle medium/long term trajectory. Layer L3 may include navigation calculation, traffic congestion avoidance, as well as other strategical planning about transport mission.

Moreover, in the embodiment illustrated in FIG. 4, each one of the first and second vehicle motion management controllers 40, 42 is adapted to issue said at least one control signal to each one of the first and second steering actuators 14, 16.

Figure 5:
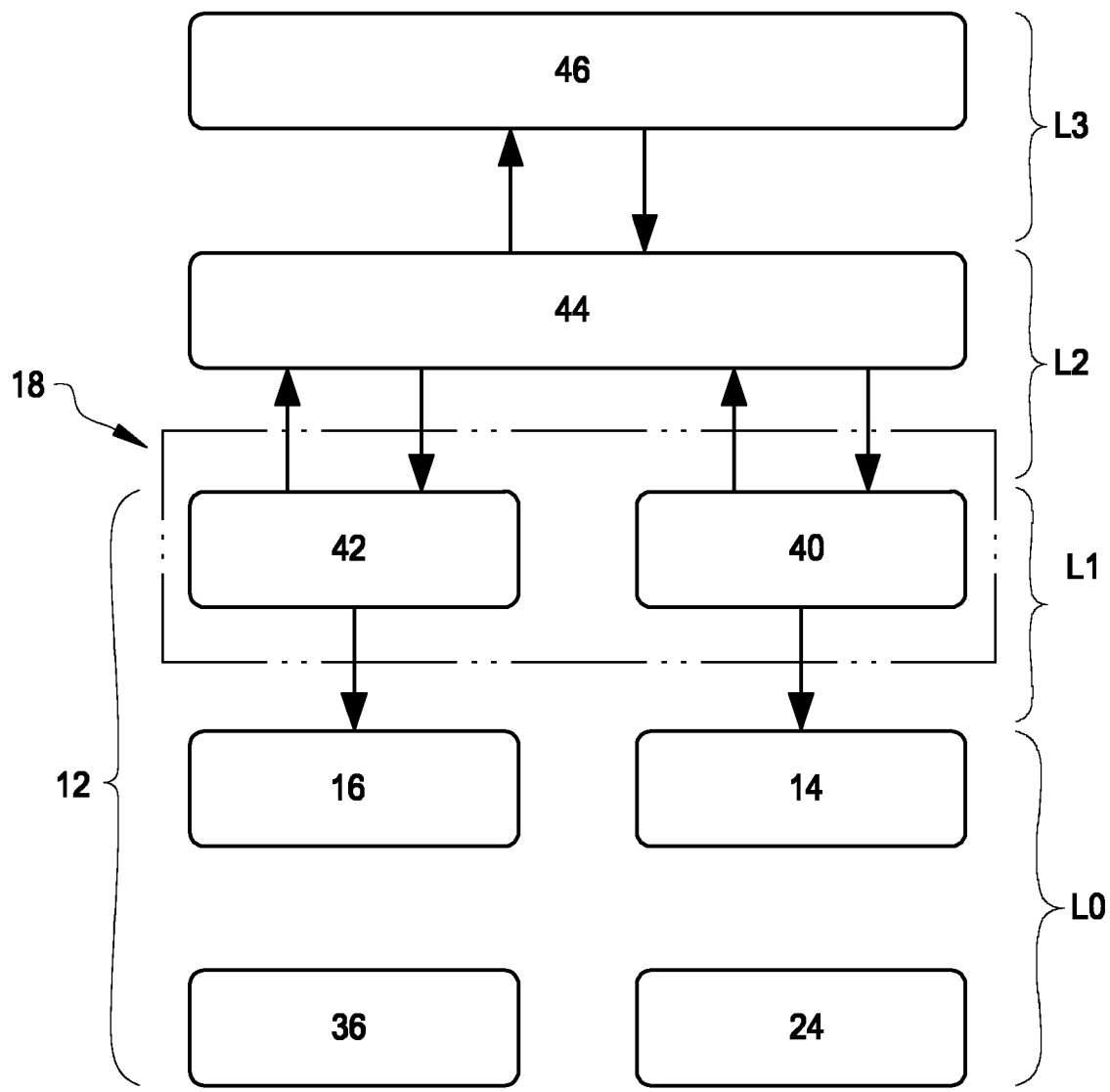
FIG. 5 is a schematic view of a steering assembly according to yet another embodiment of the present invention.

In contrast, FIG. 5 illustrates another embodiment of the steering assembly 12 wherein the first vehicle motion management controller 40 is adapted to issue said at least one control signal to the first steering actuator 14, but not to the second steering actuator 16, and the second vehicle motion management controller 42 is adapted to issue said at least one control signal to the second steering actuator 16, but not to the first steering actuator 24.

It should be noted that although each one of FIG. 4 and FIG. 5 illustrates embodiments of the steering assembly 12 comprising two hydraulic steering gears 24, 36, each one of the embodiments could also comprise only one steering gear 24 and each one of the steering actuators 14, 16 could be adapted to control the operating condition of that hydraulic steering gear 24.

Figure 6:
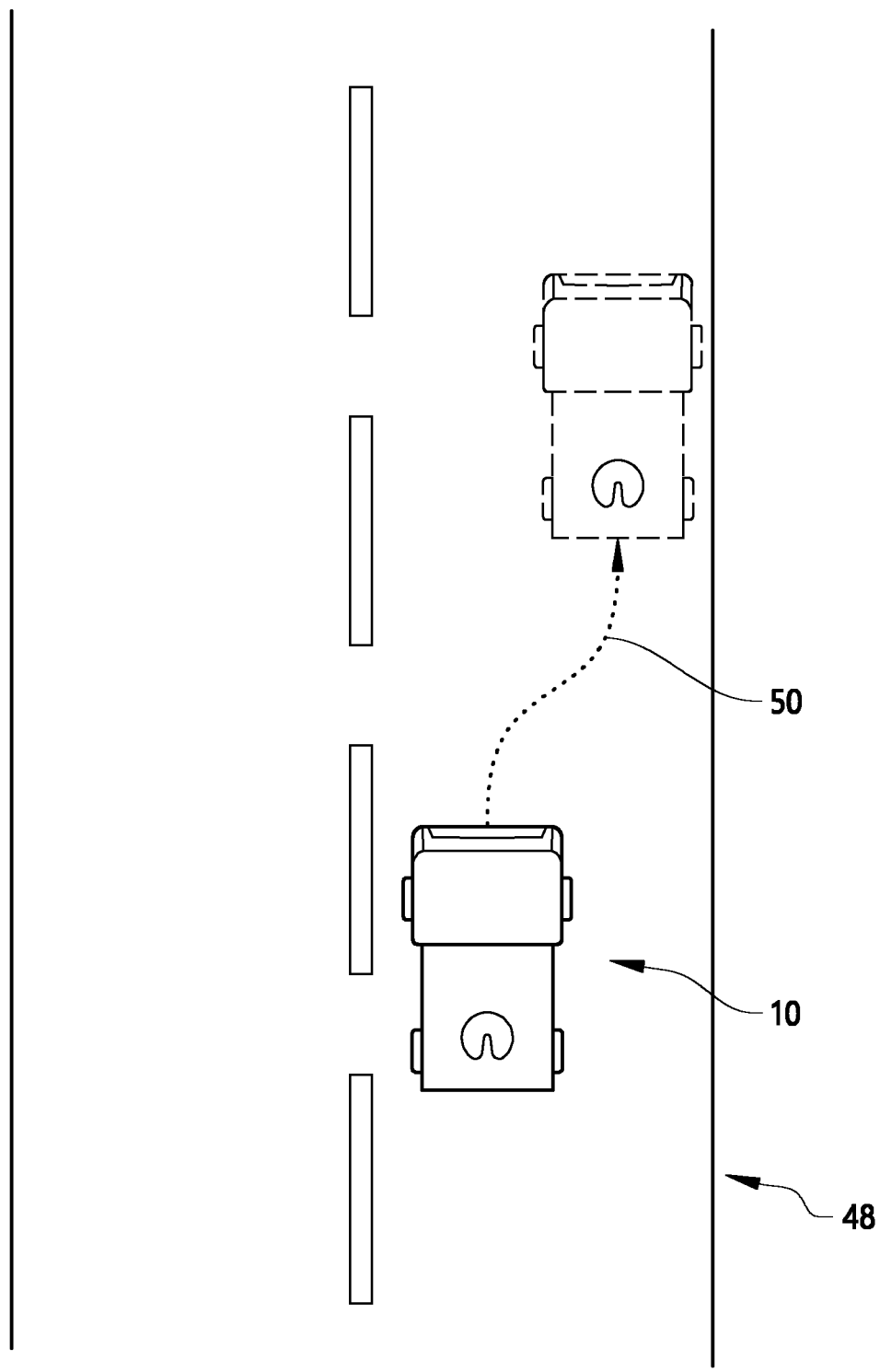
FIG. 6 is a schematic view illustrating a blind stop procedure.

FIG. 6 illustrates a vehicle 10 travelling on a road 48. The FIG. 6 vehicle 10 comprises a steering assembly 12 according to the present invention. For instance, the FIG. 6 vehicle may comprise a steering assembly 12 according to any one of the above discussed embodiments of the steering assembly.

In the event that a malfunction of the vehicle 10 is detected, the motion control system (not shown in FIG. 6) is adapted to determine a blind stop path 50 being a path that the vehicle 10 is intended to follow. Purely by way of example, and as indicated in FIG. 6, the blind stop path 50 may be such that the vehicle 10 turns to the side of the road 48—e.g. to the right hand side of the road as exemplified in FIG. 6—and is thereafter brought to a stop. The stopping position is indicated by the dotted lines in FIG. 6. The blind stop path 50 for instance be determined as a path that a predetermined point of the vehicle 10 is intended to follow. Purely by way of example, the blind stop path 50 may be estimated on a regular basis, for instance every second or less, taking one or more of the following parameters in to account: the predicted road extension in front of the vehicle, the current road-to-wheel friction and the current speed of the vehicle. Purely by way of example, the one or more parameters mentioned above may be determined using a "Traffic Situation Management" e.g. layer L2 in either of FIG. 4 and FIG. 5.

Moreover, the motion control system may further be adapted to determine whether or not the vehicle 10 can follow the blind stop path 50 if the vehicle is steered using the second steering actuator (not shown in FIG. 6) when associated with the second enhanced steering capability. As such, the motion control system may be adapted to determine whether or not the vehicle 10 can follow the blind stop path 50 even in the event of a malfunctioning associated with the first steering actuator. In the event that the motion control system determines that the vehicle 10 cannot follow the blind stop path 50 using the second steering actuator when associated with the second enhanced steering capability, the motion control system may issue a warning, alternatively the motion control system may determine an updated blind stop path 50, taking the limitations of the second enhanced steering capability into account.

Figure 7:
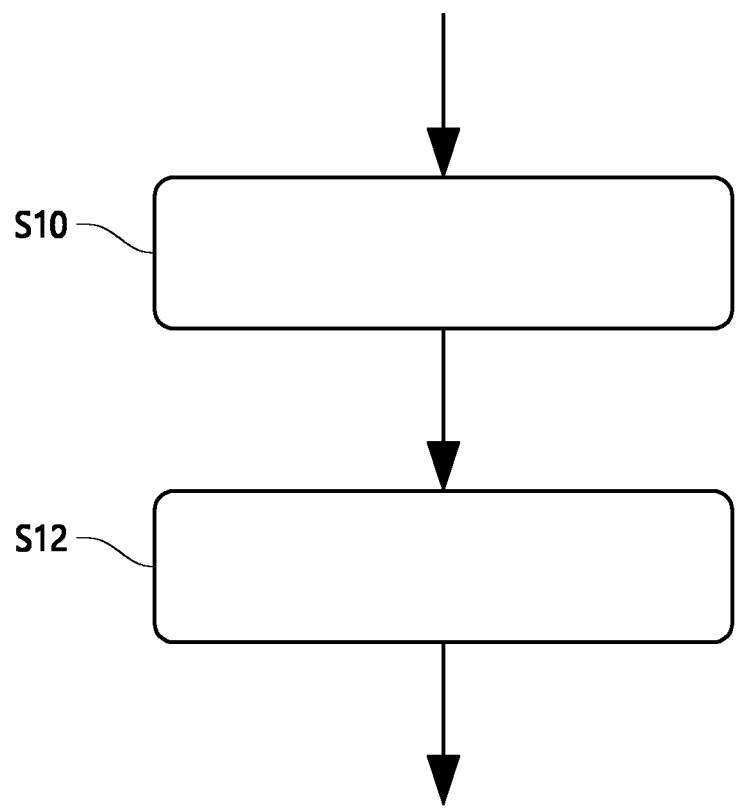
FIG. 7 is a flow chart illustrating a method according to the present invention.

FIG. 7 is a flow chart illustrating a method according the present invention. The method is performed for a steering assembly according to the present invention, for instance a steering assembly according to any one of the above-mentioned embodiments. As may be gleaned from FIG. 7, the method comprises, upon detection of a malfunction associated with the first steering actuator:

S10 associating the second steering actuator with a second enhanced steering capability instead of the second nominal steering capability, the second enhanced steering capability being different from the second nominal steering capability, and S12 steering the vehicle using the second steering actuator.

Purely by way of example, the above method may be performed by computer program comprising program code means. By way of example, such a computer program may be stored or carried by a computer readable medium. Optionally, the above method may be performed by a control unit.

It is to be understood that the present invention is not limited to the embodiments described above and illustrated in the drawings; rather, the skilled person will recognize that many changes and modifications may be made within the scope of the appended claims.

The invention claimed is:

1. A steering assembly for a vehicle, comprising:
   a first steering actuator configured to be actuated in accordance with at least one signal issued from a motion control system comprising a computerized control unit to control a steering angle of at least one steerable ground engaging member of the vehicle to control steering of the vehicle, the first steering actuator associated with a first nominal steering capability, defining at least one limitation of the at least one steerable ground engaging member, the at least one limitation of the first nominal steering capability comprising at least one of steering angle, steering angle rate, and steering torque,
   a second steering actuator configured to be actuated in accordance with at least one signal issued from the motion control system to control the steering angle of the at least one steerable ground engaging member of the vehicle to control the steering of the vehicle, the second steering actuator associated with a second nominal steering capability, defining at least one limitation of the at least one steerable ground engaging member, the at least one limitation of the second nominal steering capability comprising at least one of steering angle, steering angle rate, and steering torque,
   wherein the motion control system is configured to, upon detection of a malfunction associated with the first steering actuator, associate the second steering actuator with a second enhanced steering capability instead of the second nominal steering capability, the second enhanced steering capability being different from the second nominal steering capability;
   wherein the motion control system is configured to determine a blind stop path being a path that the vehicle is intended to follow during a malfunction of the vehicle;
   wherein the motion control system is configured to determine whether the vehicle can follow the blind stop path if the vehicle is steered using the second steering actuator when associated with the second enhanced steering capability; and
   wherein the steering assembly comprises at least one of the following features (i) and (ii):
      (i) the motion control system is configured to, when no malfunction associated with the first steering actuator is detected, automatically select which one of the first steering actuator, associated with the first nominal steering capability, and the second steering actuator, associated with the second nominal steering capability, should be currently actuated in order to control the steering angle of the at least one steerable ground engaging member in a manner capable of following the blind stop path, and automatically issue at least one signal to the thus selected steering actuator for control of the thus selected steering actuator; and (ii) the motion control system is configured to, upon detection of a malfunction associated with the first steering actuator, automatically issue at least one signal to the second steering actuator to control the steering angle of the at least one steerable ground engaging member of the vehicle to control the steering of the vehicle in a manner capable of following the blind stop path.

2. The steering assembly of claim 1, wherein the second nominal steering capability comprises a second nominal maximum steering angle and the second enhanced steering capability comprises a second enhanced maximum steering angle, the second enhanced maximum steering angle being greater than the second nominal maximum steering angle.

3. The steering assembly of claim 1, wherein the first nominal steering capability is different from the second nominal steering capability.

4. The steering assembly of claim 3, wherein the first nominal steering capability comprises a first nominal maximum steering angle, the first nominal maximum steering angle being greater than the second nominal maximum steering angle.

5. The steering assembly of claim 1, wherein the second nominal steering capability comprises a second nominal maximum actuation load that the second steering actuator is allowed to produce when associated with the second nominal steering capability and wherein the second enhanced steering capability comprises a second enhanced maximum actuation load that the second steering actuator is allowed to produce when associated with the second enhanced steering capability, a ratio between the second enhanced maximum actuation load and the second nominal maximum actuation load being at least 1.5.

6. The steering assembly of claim 1, wherein the steering assembly comprises a hydraulic steering gear configured to be connected to the at least one steerable ground engaging member, each one of the first and second steering actuators configured to control an operating condition of the hydraulic steering gear.

7. The steering assembly of claim 1, wherein the steering assembly comprises a first hydraulic steering gear configured to be connected to the at least one steerable ground engaging member, the first steering actuator configured to control the operating condition of the first hydraulic steering gear, the steering assembly further comprising a second hydraulic steering gear configured to be connected to the at least one steerable ground engaging member, the second steering actuator configured to control the operating condition of the second hydraulic steering gear.

8. The steering assembly of claim 1, wherein the first steering actuator is configured to produce a first nominal maximum actuation load when associated with the first nominal steering capability and the second steering actuator is configured to produce a second nominal maximum actuation load when associated with the second nominal steering capability, the first nominal maximum actuation load being greater than the second nominal maximum actuation load.

9. The steering assembly of claim 1, wherein the motion control system comprises a first vehicle motion management controller and a second vehicle motion management controller, each one of the first and second vehicle motion management controllers configured to issue the at least one signal for controlling the steering of the vehicle.

10. The steering assembly of claim 9, wherein each one of the first and second vehicle motion management controllers is configured to issue the at least one control signal to each one of the first and second steering actuators.

11. The steering assembly of claim 9, wherein the first vehicle motion management controller is configured to issue the at least one control signal to the first steering actuator, but not to the second steering actuator, and the second vehicle motion management controller is configured to issue the at least one control signal to the second steering actuator, but not to the first steering actuator.

12. The steering assembly of claim 1, wherein the motion control system is configured to, upon detection of a malfunction associated with the first steering actuator, associate the second steering actuator with the second enhanced steering capability instead of the second nominal steering capability during a predetermined enhanced steering time only, the enhanced steering time being within the range of 2 to 600 seconds.

13. The steering assembly of claim 1, wherein the motion control system is configured to, when no malfunction associated with the first steering actuator is detected, automatically select which one of the first steering actuator, associated with the first nominal steering capability, and the second steering actuator, associated with the second nominal steering capability, should be currently actuated in order to control the steering angle of the at least one steerable ground engaging member in a manner capable of following the blind stop path, and automatically issue at least one signal to the thus selected steering actuator for control of the thus selected steering actuator.

14. The steering assembly of claim 1, wherein the motion control system is configured to, upon detection of a malfunction associated with the first steering actuator, automatically issue at least one signal to the second steering actuator to control the steering angle of the at least one steerable ground engaging member of the vehicle to control the steering of the vehicle in a manner capable of following the blind stop path.

15. A method for steering a vehicle comprising:
detecting a malfunction associated with a first steering actuator of a steering assembly, the first steering actuator configured to be actuated in accordance with at least one signal issued from a motion control system comprising a computerized control unit to control a steering angle of at least one steerable ground engaging member of the vehicle to control steering of the vehicle, the first steering actuator associated with a first nominal steering capability, defining at least one limitation of the at least one steerable ground engaging member, the at least one limitation of the first nominal steering capability comprising at least one of steering angle, steering angle rate, and steering torque,
utilizing the motion control system to associate a second steering actuator of the steering assembly with a second enhanced steering capability instead of a second nominal steering capability, the second enhanced steering capability being different from the second nominal steering capability, the second steering actuator configured to be actuated in accordance with at least one signal issued from the motion control system to control the steering angle of the at least one steerable ground engaging member of the vehicle to control the steering of the vehicle, the second steering actuator associated with the second nominal steering capability, defining at least one limitation of the at least one steerable ground engaging member, the at least one limitation of the second nominal steering capability comprising at least one of steering angle, steering angle rate, and steering torque, steering the vehicle using the second steering actuator, utilizing the motion control system to determine a blind stop path being a path that the vehicle is intended to follow during a malfunction of the vehicle, utilizing the motion control system to determine whether the vehicle can follow the blind stop path if the vehicle is steered using the second steering actuator when associated with the second enhanced steering capability, and performing at least one of the following steps (i) and (ii):
(i) when no malfunction associated with the first steering actuator is detected, utilizing the motion control system to automatically select which one of the first steering actuator, associated with the first nominal steering capability, and the second steering actuator, associated with the second nominal steering capability, should be currently actuated in order to control the steering angle of the at least one steerable ground engaging member in a manner capable of following the blind stop path, and to automatically issue at least one signal to the thus selected steering actuator for control of the thus selected steering actuator; and
(ii) upon detection of a malfunction associated with the first steering actuator, utilizing the motion control system to automatically issue at least one signal to the second steering actuator to control the steering angle of the at least one steerable ground engaging member of the vehicle to control the steering of the vehicle in a manner capable of following the blind stop path.

16. The method of claim 15, wherein the second nominal steering capability comprises a second nominal maximum steering angle and the second enhanced steering capability comprises a second enhanced maximum steering angle, the second enhanced maximum steering angle being greater than the second nominal maximum steering angle.

17. The method of claim 15, wherein the first nominal steering capability is different from the second nominal steering capability.

18. The method of claim 17, wherein:
the second nominal steering capability comprises a second nominal maximum steering angle and the second enhanced steering capability comprises a second enhanced maximum steering angle, the second enhanced maximum steering angle being greater than the second nominal maximum steering angle, and
the first nominal steering capability comprises a first nominal maximum steering angle, the first nominal maximum steering angle being greater than the second nominal maximum steering angle.

19. The method of claim 15, wherein the second nominal steering capability comprises a second nominal maximum actuation load that the second steering actuator is allowed to produce when associated with the second nominal steering capability and wherein the second enhanced steering capability comprises a second enhanced maximum actuation load that the second steering actuator is allowed to produce when associated with the second enhanced steering capability, a ratio between the second enhanced maximum actuation load and the second nominal maximum actuation load being at least 1.5.

20. The method of claim 15, wherein the steering assembly comprises a hydraulic steering gear configured to be connected to the at least one steerable ground engaging member, each one of the first and second steering actuators configured to control the operating condition of the hydraulic steering gear.

21. The method of claim 15, wherein the steering assembly comprises a first hydraulic steering gear configured to be connected to the at least one steerable ground engaging member, the first steering actuator configured to control the operating condition of the first hydraulic steering gear, the steering assembly further comprising a second hydraulic steering gear configured to be connected to the at least one steerable ground engaging member, the second steering actuator configured to control the operating condition of the second hydraulic steering gear.

22. The method of claim 15, wherein the first steering actuator is configured to produce a first nominal maximum actuation load when associated with the first nominal steering capability and the second steering actuator is configured to produce a second nominal maximum actuation load when associated with the second nominal steering capability, the first nominal maximum actuation load being greater than the second nominal maximum actuation load.

23. The method of claim 15, wherein the method comprises, upon detection of a malfunction associated with the first steering actuator, associate the second steering actuator with the second enhanced steering capability instead of the second nominal steering capability during a predetermined enhanced steering time only, the enhanced steering time being within the range of 2 to 600 seconds.

24. The method of claim 15, wherein the method comprises, when no malfunction associated with the first steering actuator is detected, utilizing the motion control system to automatically select which one of the first steering actuator, associated with the first nominal steering capability, and the second steering actuator, associated with the second nominal steering capability, should be currently actuated in order to control the steering angle of the at least one steerable ground engaging member in a manner capable of following the blind stop path, and to automatically issue at least one signal to the thus selected steering actuator.

25. The method of claim 15, wherein the method comprises, upon detection of a malfunction associated with the first steering actuator, utilizing the motion control system to automatically issue at least one signal to the second steering actuator to control the steering angle of the at least one steerable ground engaging member of the vehicle to control the steering of the vehicle in a manner capable of following the blind stop path.

* * * * *